United States Patent [19]

Murakami

[11] Patent Number: 5,473,735
[45] Date of Patent: Dec. 5, 1995

[54] PAGE PRINTER

[75] Inventor: Masahiro Murakami, Hekinan, Japan

[73] Assignee: Brother Kogyo Kabushiki Kaisha, Nagoya, Japan

[21] Appl. No.: 87,277

[22] Filed: Jul. 8, 1993

[30]     Foreign Application Priority Data

Aug. 7, 1992 [JP] Japan .................................. 4-232826

[51] Int. Cl.$^6$ .................................................. G06K 15/00
[52] U.S. Cl. ........................................... 395/116; 395/113
[58] Field of Search .................................... 395/115, 116, 395/113, 164, 165, 166; 400/70, 74, 61, 62; 358/404, 444

[56]           References Cited

U.S. PATENT DOCUMENTS

| | | | |
|---|---|---|---|
| 5,108,207 | 4/1992 | Isobe et al. | 395/115 |
| 5,218,670 | 6/1993 | Sedek, Jr. | 395/115 |

FOREIGN PATENT DOCUMENTS

2-52763  2/1990  Japan .

*Primary Examiner*—Arthur G. Evans
*Attorney, Agent, or Firm*—Oliff & Berridge

[57]                ABSTRACT

In the page printer of this invention, a sheet is discharged and an error occurrence is displayed on a display unit when an over-run error occurs during a printing operation. Subsequently, the print data of the 1/n portion of the page which was being converted to dot image data at the error-occurrence time is developed into dot image data and stored into a RAM together with an error-occurrence position. The print data is re-converted to the dot image data and printed. When the printing operation reaches the error-occurrence position stored in the RAM, the dot image data stored in the RAM is transmitted to a video RAM, and the printing operation is continued. Therefore, this page printer can automatically carry out the re-printing operation when an over-run error occurs.

15 Claims, 5 Drawing Sheets

| ITEM | INSTRUCTIONS |
|---|---|
| S1 | INITIALIZE RAM |
| S2 | INPUT PRINT DATA |
| S3 | PRINT DATA OF ONE PAGE INPUT ? |
| S4 | DOT IMAGE DEVELOPMENT |
| S5 | A ← A + 1 |
| S6 | DOT IMAGE DATA OF 1 / n DEVELOPED ? |
| S7 | SHEET SUPPLY |
| S8 | SHEET FEEDING |
| S9 | PULSE INPUT ? |
| S10 | PRINT FOR ONE RASTER |
| S11 | B ← B + 1 |
| S12 | DOES PRINT DATA EXIST IN RAM ? |
| S13 | DOT IMAGE DEVELOPMENT |
| S14 | PULSE INPUT ? |
| S15 | DEVELOPMENT FOR ONE RASTER ? |
| S16 | A ← A + 1 |
| S17 | INTERRUPT DEVELOPMENT |
| S18 | A > B ? |
| S19 | PRINT FOR ONE RASTER |
| S20 | B ← B + 1 |
| S50 | PULSE INPUT ? |
| S51 | PRINT FOR ONE RASTER |
| S52 | B ← B + 1 |
| S53 | A > B ? |
| S54 | DISCHARGE SHEET |

Fig.2D

| ITEM | INSTRUCTIONS |
|---|---|
| S21 | SHEET DISCHARGE |
| S22 | ERROR DISPLAY |
| S23 | INITIALIZE COUNTER |
| S24 | DOT IMAGE DEVELOPMENT AND STORAGE INTO RAM |
| S25 | DOT IMAGE DEVELOPMENT |
| S26 | A ← A + 1 |
| S27 | DOT IMAGE DATA OF 1/n PAGE DEVELOPED ? |
| S28 | SHEET SUPPLY |
| S29 | SHEET FEEDING |
| S30 | PULSE INPUT ? |
| S31 | PRINT FOR ONE RASTER |
| S32 | B ← B + 1 |
| S33 | ERROR-OCCURRENCE POSITION ? |
| S34 | TRANSMIT DOT IMAGE DATA IN RAM TO VIDEO RAM |
| S35 | A ← A + K |
| S36 | PULSE INPUT ? |
| S37 | PRINT FOR ONE RASTER |
| S38 | B ← B + 1 |
| S39 | A > B ? |
| S40 | DISCHARGE SHEET ? |
| S41 | DOES PRINT DATA EXIST IN RAM ? |
| S42 | DOT IMAGE DEVELOPMENT |
| S43 | PULSE INPUT ? |
| S44 | ONE RASTER DEVELOPED ? |
| S45 | A ← A + 1 |
| S46 | INTERRUPT DEVELOPMENT |
| S47 | A > B ? |

PAGE PRINTER

BACKGROUND OF THE INVENTION

1. Field of the Invention

This invention relates to a page printer usable as an output device for a personal computer.

2. Description of Related Art

Personal computer users increasingly demand high-speed operation and high performance in a printing device connected to a personal computer. Particularly, an electrophotographic printing device using a laser diode, an LED or the like as a light source has been widely used because of its high speed and high print quality. This type of printing device is designed to receive one page of data and then to print out each page in accordance with a constant-speed sheet-feeding operation. Thus, this type of printer is called a "page printer".

This high-speed "page printer" printing device necessarily requires a high speed processing system. Various types of print data processing systems are known and are classified into the following two systems.

The first system is a page memory system. This system has a memory (video RAM) capable of storing one page of dot image data. In this system, character codes which are received from a host computer are interpreted, converted to bitmaps, and stored as dot image data in the memory. When the dot image data for an entire page has been received, interpreted and converted, a print engine prints the prepared page.

This page memory system advantageously directly stores the image data for one page. However, this page memory system also requires an expensive memory (video RAM) having an extremely large capacity.

The second page memory system, which compensates for the large capacity memory requirement of the first page memory system, is a video RAM system which uses an image development area corresponding to a 1/n portion of a page, where n represents an integer greater than or equal to 2. This second page memory system uses a text memory (RAM) unit to store character codes for one page in text form, rather than as a bitmap, and a video RAM unit for storing dot image data of the 1/n portion of the page.

When receiving the character codes from the host computer, a CPU of the page printer interprets the character codes, develops character code data from the character codes, then adds the developed character code data with information of the character writing position in the video RAM to prepare the text data. The text data is written into the text memory. After the text data of one page is prepared and stored into the text memory, the CPU then converts the text data from the beginning of the text memory and writes it as dot image data into the video RAM.

Since the video RAM has a limited storage capacity, corresponding to the 1/n portion of the page, after the first 1/n portion of the dot image data of the text data is converted and stored into the video RAM, the printing operation is started. Once the dot image data has been printed, it is no longer necessary for the video RAM to continue to store the printed dot image data.

As the video RAM also outputs data from the beginning, a "vacant" area is formed from the beginning of the video RAM corresponding to the locations of the video RAM which store the printed dot image data. Therefore, the next 1/n portion of the text data in the text memory is converted and stored to the video RAM as vacant areas become available. Thus, new dot image data is written into the newly-available vacant areas. As described above, the readout operation from the video RAM unit and the write-in operation into the video RAM unit are carried out alternately to perform a printing operation of one page.

As described above, in the second video RAM system, the one-page printing operation is carried out using a video RAM having a storage capacity of only a 1/n portion of a page and a text memory (RAM) having sufficient capacity to store an entire page as text data. Therefore, this type of printing device has an advantage the memory capacity is greatly reduced in comparison to the first page memory system.

However, in the second video RAM system printing device, the dot image data of a next raster is written into the video RAM only after a predetermined amount of vacant area becomes available in the video RAM unit, causing the following problem. When a large time period is necessary to convert the next text data to the dot image data, additional dot image data remaining in the video RAM is liable to be printed before any new dot image data is written into the video RAM. If such a state continues, the video RAM will become emptied of the dot image data. Further, since the sheet feeding operation is carried out at a constant speed at all times, printing becomes impossible (i.e. an over-run error occurs) if dot image data cannot be continuously read out of the video RAM.

In order to solve the this problem, a technique of using a part of the text memory as a video RAM unit when an over-run error occurs has been proposed in Japanese Laid-open Patent Application No. 2-52763.

However, this technique has the following problem. Since the amount of additional video RAM unit necessary to suppress the over-run error is unknown, a trial-and-error determination of the necessary additional video RAM must be repeated several times, so that this technique is inapplicable when rapid processing is required. In addition, a user is required to input a re-printing instruction when he learns an error through an over-run error indication. Therefore, if the device is used in an unmanned condition, printing is interrupted for a long time after the over-run error occurs. Thus, printing the page is not completed.

SUMMARY OF THE INVENTION

This invention provides a page printer having a re-printing operation which is automatically restarted after an over-run error occurs.

The page printer according to this invention includes: data reception means for receiving print data from an external device, first storage means for storing print data of at least one page which was received by the data reception means, image data preparation means for successively reading out the print data stored in the first storage means to generate dot image data, second storage means for storing a 1/n portion of the page of the dot image data generated by the image data preparation means, print means for successively printing the dot image data stored in the second storage means to a recording medium, detection means for detecting the absence of unprinted dot image data in the second storage means before the print means completely prints the print data of one page stored in the first storage means to the recording medium, re-printing means for actuating the image data preparation means and the print means to re-print the print data of the incompletely printed page when the absence of unprinted dot image data in the second storage means is detected before the print means completely prints the print data of one page stored in the first storage means to the recording medium, and third storage means for storing, before the re-printing operation of the re-print means, dot image data pre-converted by the image data preparation means by reading out the next dot image data to be converted when the detection means detects the absence of unprinted dot image data in the second storage means, the print means printing on the basis of the dot image data stored in both the second storage means and the third storage means.

According to the page printer of this invention, when the data reception means receives the print data from the external device, the first storage means stores at least one page of print data received by the data reception means. The image data preparation means successively reads out the print data stored in the first storage means and generates the dot image data. The second storage means stores the converted dot image data comprising the first 1/n portion of the page. The print means successively prints the dot image data stored in the second storage means from the top of the second storage means. When the detection means detects the absence of unprinted dot image data in the second storage means before the print means completely prints the one page of print data stored in the first storage means, the re-print means actuates the image data preparation means and the print means to re-print the one page of print data which has not been completely printed.

Before re-printing the unprinted page, the image data preparation means reads out the print data of a next 1/n portion of the page from the first storage means. The next 1/n portion contains the print data which would have been next prepared by the image data preparation means when the detection means detected the absence of unprinted dot image data in the second storage means. The third storage means stores the dot image data of the preconverted next 1/n portion of the page. The print means prints on the basis of the dot image data stored in the second storage means and the dot image data stored in the third storage means when actuated by the re-print means.

DETAILED DESCRIPTION OF THE PREFERRED EMBODIMENT

A preferred embodiment according to this invention will be described with reference to the accompanying drawings. The construction of a page printer I will be first described with reference to FIG. 1.

Figure 1:
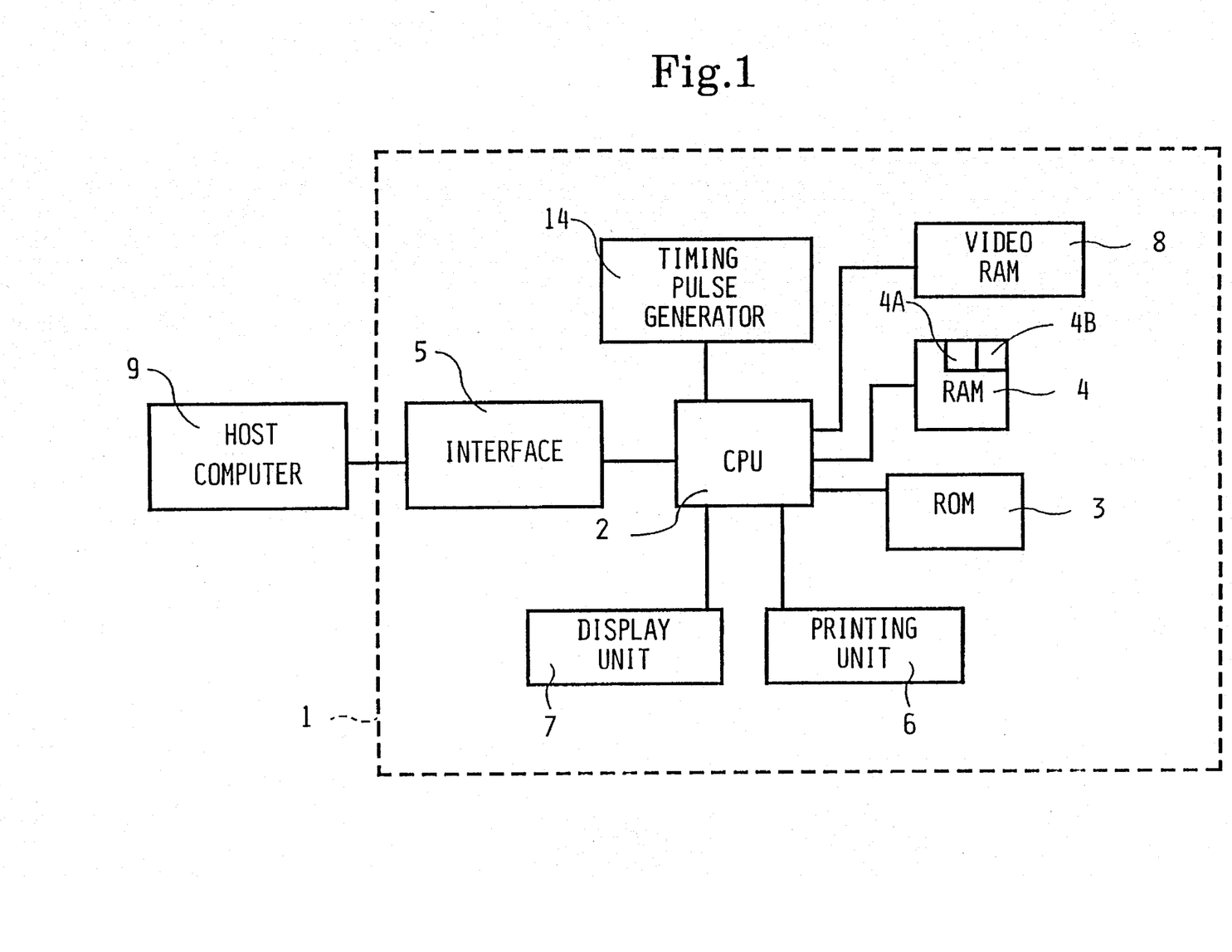
FIG. 1 is a block diagram showing an embodiment of this invention.
Figure 2A:
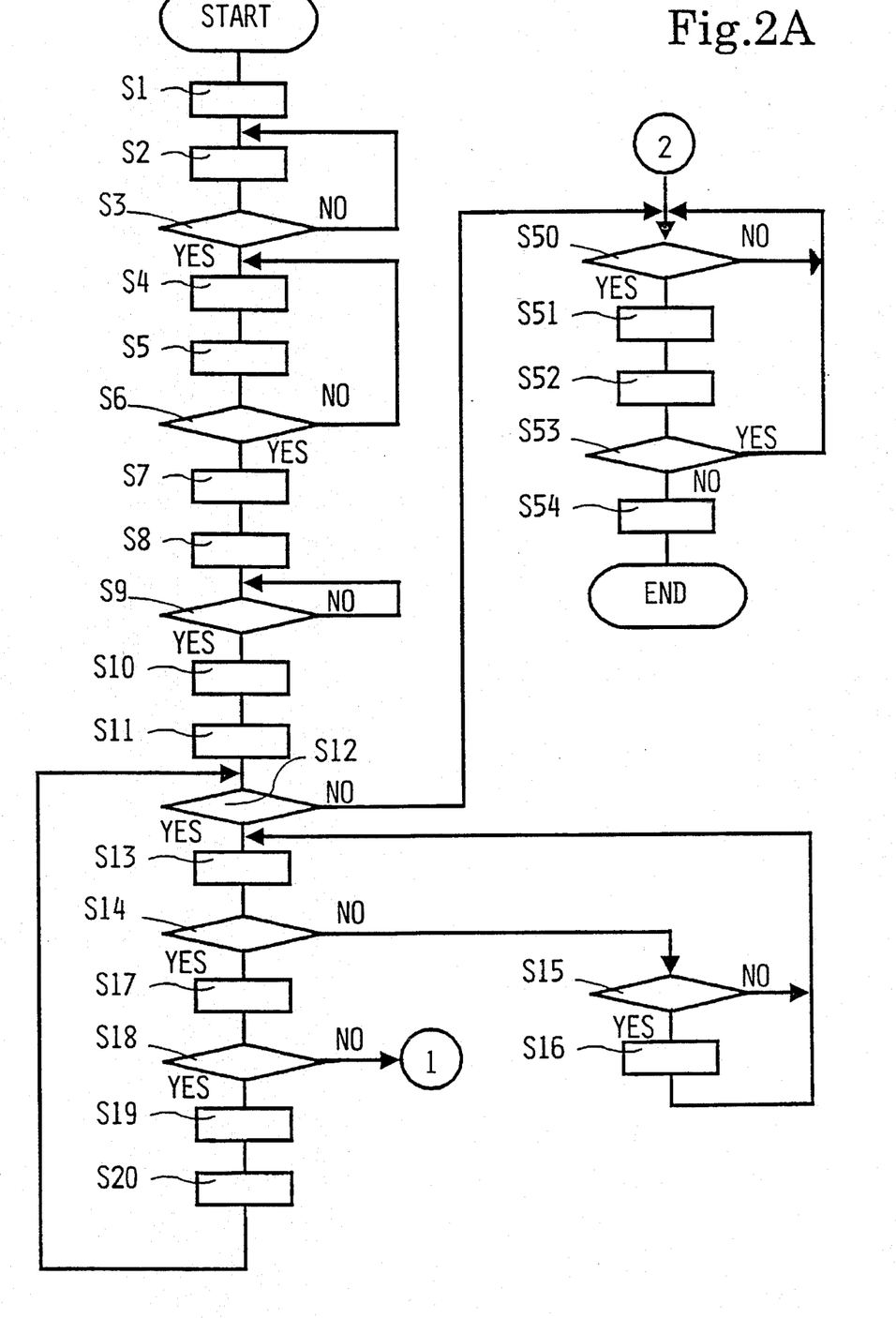
FIGS. 2A, 2B, 2C, 2D are a flowchart for an operation of the embodiment according to this invention.
Figure 2B:
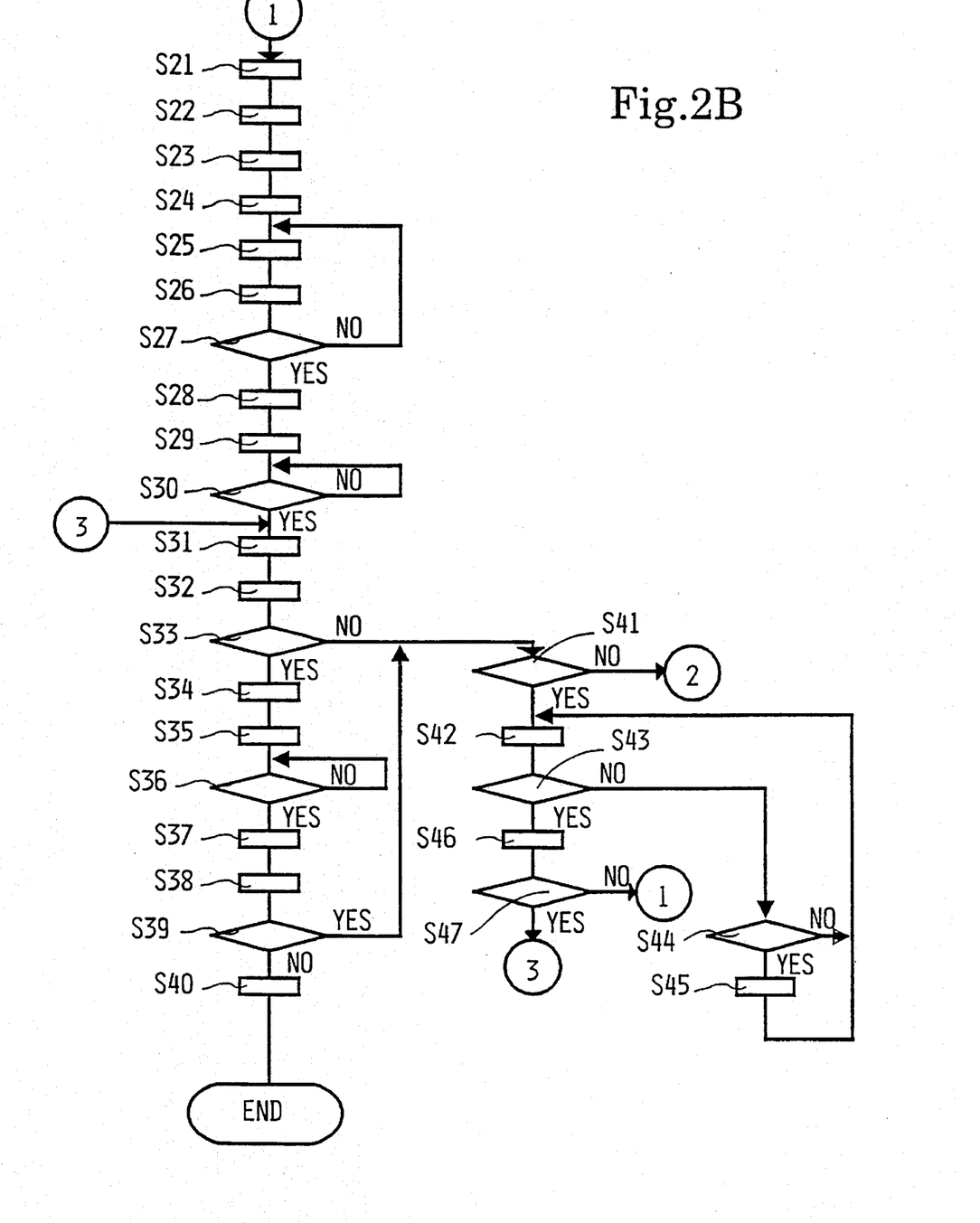
Figure 2C:
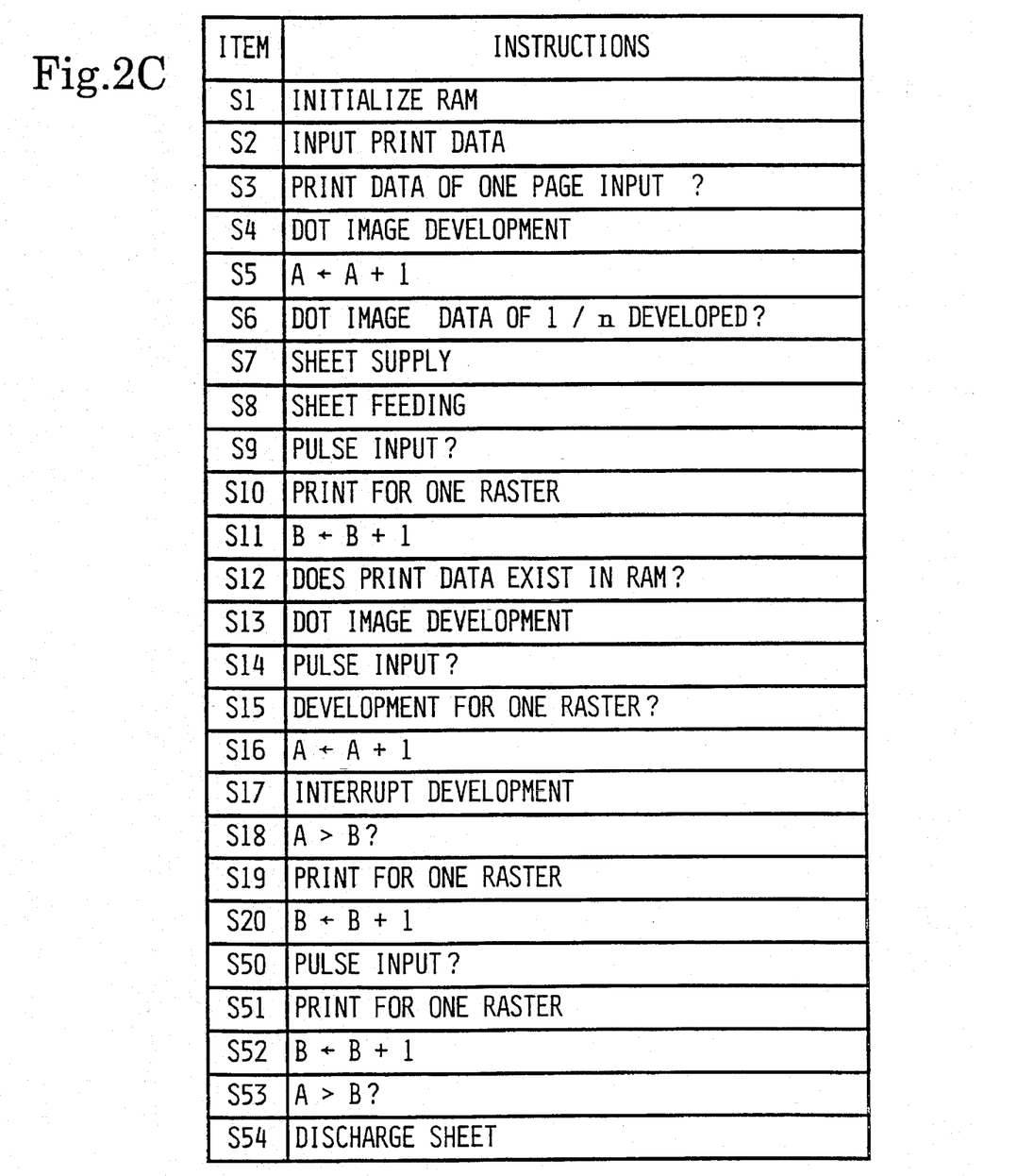
Figure 2D:
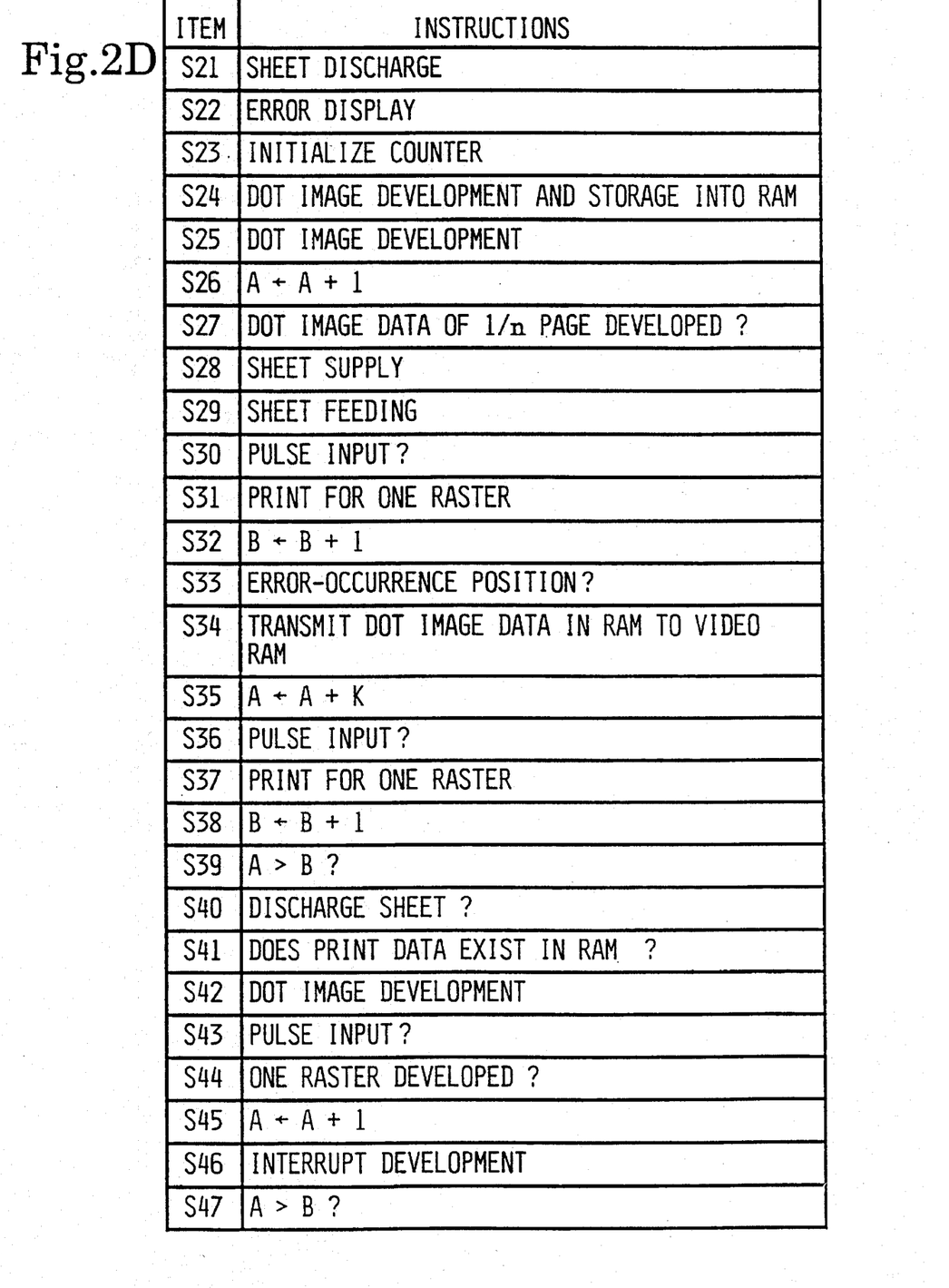

The page printer I of this embodiment comprises a CPU 2, a ROM 3, a RAM 4, an input/output interface 5, a print unit 6, a display unit 7, a video RAM 8 and a timing pulse generator 14.

The ROM 3 stores various programs such as a program for controlling the print unit 6, a program for detecting an over-run error, a program for converting print data, data such as font data, and the like. The ROM 3 is connected to the CPU 2.

The RAM 4 stores the print data received from the host computer 9 and a part of the dot image data. The part of the dot image data stored in the RAM 4 is converted after an over-run error occurs. The RAM 4 is connected to the CPU 2. The RAM 4 has two counters 4A and 4B. The first counter 4A counts the number of rasters of dot image data converted from the print data by the CPU 2 and output to the video RAM 8. The second counter 4B stores the number of rasters output from the video RAM 8 and printed by the print unit 6.

The input/output interface 5 is connectable to the host computer 9. The input/output interface 9 is also connected to the CPU 2. The input/output interface 5 transmits and receives data between the page printer 1 and the host computer 9.

The print unit 6 prints an image on a print medium, not shown, on the basis of the dot image data stored in the vide RAM 8. The print unit 6 is connected to the CPU 2. The display unit 7 displays a setting, a status, or the like of the page printer and is connected to the CPU 2. The display unit 7 also includes one or more alarms. The alarms can include a visual alarm, such as a flashing or steady LED, a blinking display on an LCD or a message on an LCD. The alarms can also or alternately include an audio alarm, such as a piezoelectric buzzer or beeper, a bell, a continuous tone generator or the like.

The video RAM 8 stores dot image data of a 1/n portion of a page of dot image data, and receives and stores the dot image data output from the RAM 4. The video RAM 8 is connected to the CPU 2.

The timing generator 14 is connected to the CPU 2, and outputs a print timing pulse to the CPU 2 at a predetermined rate when a sheet is fed to a print start position. The CPU 2 outputs one raster's worth of dot image data from the video RAM 8 to the print unit 6 every time the print timing pulse is input to the CPU 2 from the timing generator 14.

Next, the operation of the page printer will be described with reference to FIGS. 1 and 2A–2D. The print data received from the host computer 9 through the input/output interface 5 is added to information on a print position, etc., then temporarily stored in the RAM 4. When print data for one full page is stored in the RAM 4, the CPU 2 begins converting the print data stored in the RAM 4 into dot image data. The print data is converted from the top of the RAM 4. The converted print data is stored as dot image data into the video RAM 8. In general, each line of text data will be converted into a number of rasters of dot image data. For example, in a dot matrix printer, each line of text could be converted into 9, 24, 48 or more rasters of dot image data. Further, in a laser printer, each line of text could be converted into 24, 48, 96 or more rasters of dot image data.

The CPU 2 further increments the count number of the first counter 4A by 1. The CPU 2 increments the count number of the first counter 4A by 1 after each conversion of one raster's worth of the print data, until dot image data corresponding to a 1/n portion of the page is stored in the video RAM 8. If the counter number is determined to correspond to the 1/n portion, the CPU 2 actuates the print unit 6 to begin printing. After each raster of the dot image data is printed, the CPU 2 increments the counter number of the second counter 4B by 1.

In the page printer 1, a sheet is supplied by a sheet supply mechanism, not shown, and the sheet is fed to the print unit 6. Once the printing operation on the sheet is started, printing is carried out at a constant speed at all times. As printing proceeds, the dot image data stored in the video RAM 8 is output to the print unit 8 on a raster-by-raster basis. Simultaneously, the CPU 2 converts a next raster's worth of print data stored in the RAM 4 into dot image data, and stores the dot image data into the newly-vacated area of the video RAM 8. The CPU 2 increments the count value of the first counter 4A by 1 every time one raster's worth of dot image data is stored into the vacant area of the video RAM 8.

When the amount of text in a raster is small, converting the text data to dot image data occurs faster than the dot image data is printed. Thus, the CPU 2 converts the text data to dot image data after waiting for a vacancy to occur in the video RAM 8. However, as the amount of text in a raster increases, the time lag between the time required for the printing and the time required for converting to the dot image data is reduced. Finally, the conversion time becomes greater than the printing time for each raster's worth of data.

If this state continues, the amount of dot image data stored in the video RAM 8 gradually decreases. Eventually, an over-run error occurs in which no converted and unprinted dot image data exists in the video RAM 8. After the CPU 2 detects the over-run error, the CPU 2 ceases printing and drives the sheet discharge mechanism (not shown) to discharge the unfinished sheet out of the main body of the page printer 1. Subsequently, the CPU 2 converts a 1/n portion of the text data from the point when the over-run error occurred. This 1/n portion of converted dot image data is then stored into a vacant area of the RAM 4. The CPU then begins reprinting the page from the top of the page. When the printing operation reaches the position where the over-run error occurred, the CPU 2 transmits the converted dot image data which is stored in the RAM 4 to the video RAM 8 and continues the printing operation.

Next, the operation of this embodiment when the over-run error occurs will be described with reference to the flowchart shown in FIGS. 2A–2D. When the print data is input from the host computer through the input/output interface 5 to the page printer 1, the CPU 2 first initializes the RAM 4 (S1), and begins storing the input print data into the RAM 4 (S2). Subsequently, the CPU 2 determines whether the print data of one full page is input to the RAM 4 (S3). If the CPU 2 determines that one full page of print data has not been input to the RAM 4 (S3:No), the CPU 2 repeats steps S2 and S3.

If the CPU 2 determines that one full page of print data has been input to the RAM 4 (S3:Yes), the CPU 2 successively reads out the print data from the top of the RAM 4 to begin converting the print data into dot image data (S4). When the print data has been converted into a raster's worth of dot image data, the CPU 2 stores the converted dot image data into the video RAM 8, and increments the count value of the first counter 4A by 1 (S5). Next, the CPU 2 determines from the raster number stored in the counter 4A, whether the amount of converted dot image stored into the video RAM 8 comprises a 1/n portion of the page (S6). If the CPU 2 determines that the amount of converted dot image comprising the 1/n portion of the page has not yet been stored into the video RAM 8 (S6:No), the CPU 2 repetitively executes steps S4 and S5.

If the CPU 2 determines that the amount of converted dot image stored into the video RAM 8 comprises the 1/n portion of the page (S6:Yes), the CPU 2 drives the sheet supply mechanism (not shown) to separate one sheet (S7), and then drives a sheet feeding mechanism (not shown) to feed the separated sheet to the print unit 6 (S8). The sheet is fed at a constant speed until the sheet is discharged from the printer 1.

The CPU 2 holds until a print timing pulse is input from the print timing pulse generator 14 (S9). When the sheet is fed to a first print position, the print timing pulse from the timing pulse generator 14 is input to the CPU 2 (S9:Yes). In response to the timing pulse, the CPU 2 outputs one raster's worth of the dot image data stored in the video RAM 8 to the print unit 6 (S10). The CPU 2 also increments the count value of the second counter 4B by 1 in response to the timing pulse (S11).

Subsequently, the CPU 2 determines whether any unprinted data which has not yet been converted into dot image data exists in the RAM 4 (S12). If the CPU 2 determines that unconverted print data exists in the RAM 4 (S12:yes), the CPU 2 converts a portion of the unconverted print data in the RAM 4 into dot image data (S13). At this time, if a next print timing pulse has not yet been input from the timing pulse generator 14 (S14:No), the CPU 2 determines whether the print data has been converted into one raster's worth of dot image data (S15). If the CPU 2 determines that the print data has not yet been converted into one raster's worth of the dot image data (S15:No), it repetitively carries out steps S13–S15.

If the CPU 2 determines that the print data has been converted into one raster's worth of dot image data (S15:Yes), the CPU 2 stores the converted dot image data into the RAM 8, increments the count number of the first counter 4A by 1 (S16), and then repetitively carries out steps S13–S15. Therefore, if the time required to convert the print data becomes long, conversion of one raster's worth of the print data to dot image data is not completed before the next print timing pulse is input. Accordingly, the conversion operation is halfway interrupted.

Upon input of the next print timing pulse from the timing pulse generator 14 to the CPU 2 (S14:Yes), the CPU 2 interrupts the conversion of the unconverted print data in the RAM 4 into dot image data (S17). Further, the CPU 2 compares the count number A of the first counter 4A with the count number B of the second counter 4B (S18). If the CPU 2 determines that A is greater than B, A>B, then one raster's worth of dot image data exists in the RAM 8 (S18:Yes). In this case the CPU 2 outputs the next raster's worth of the dot image data stored in the video RAM 8 (S19), and increments the count number of the second counter 4B by 1 (S20). Subsequently, the CPU 2 repetitively carries out steps S12–S20.

If the CPU 2 determines that no undeveloped print data exists in the RAM 4 (S12:No), the CPU 2 holds until a next print timing pulse is input from the timing pulse generator 14 (S50:No). Upon input of the next print timing pulse from the timing pulse generator 14 (S50:Yes), the CPU 2 outputs the next raster's worth of the dot image data stored in the video RAM 8 (S51), and increments the count number of the second counter 4B by 1 (S52). Subsequently, the CPU 2 compares the count numbers A and B of the first and second counters 4A and 4B (S53). If the CPU 2 determines that A is greater than B, A>B, at least one raster's worth of unprinted dot image data exists in the RAM 8 (S53:Yes). In this case, the CPU 2 repetitively carries out steps S50–S53.

If the CPU 2 determines that A is not greater than B, A≯B, then no unprinted dot image data exists in the video RAM 8 (S53:No). In this case, the CPU 2 determines that the print data of one page has been completely printed, and stops printing. The sheet is discharged from the printer body 1 (S54), and printing is terminated.

If the CPU 2 determines that A is not greater than B, A≯B, at step S18, then no unprinted dot image data exists in the video RAM 8 (S18:No). In this case, the CPU 2 determines that an over-run error has occurred. As described above, A represents the count number of the counter 4A, which is the number of rasters which have been stored in the video RAM 8 until now. In contrast, B represents the count number of the second counter 4B, which is the number of rasters which have been output from the video RAM 8 and already printed. When A is not greater than B, a determination that A ≯ B at the step S18 means that, irrespective of presence of undeveloped print data in the RAM 4, no unprinted dot image data exists in the video RAM 8. Therefore, printing is impossible, as the sheet will be discharged without the complete page image being formed on the sheet.

Upon determining that an over-run error has occurred, the CPU 2 immediately discharges the sheet from the printer body (S21), and controls the display unit 7 to indicate the over-run error (S22). Further, the CPU 2 initializes the first and second counters 4A and 4B in the RAM 4 (S23). Subsequently, the CPU 2 converts the next 1/n portion of print data into dot image data. The print data is converted from the point of the print data being converted to dot image data at the time when the error occurred. This pre-converted dot image data is stored in the RAM 4 together with the position of the error occurrence time (S24).

Subsequently, the CPU 2 again successively reads out the print data from the RAM 4 and starts converting the read-out print data into dot image data (S25). When print data is converted into one raster's worth of dot image data, the CPU 2 stores the converted dot image data into the RAM 8. The CPU 2 then increments the count number of the first counter 4A by 1 (S26).

Subsequently, the CPU 2 determines, on the basis of the raster number stored in the counter 4A, whether the converted dot image data stored in the video RAM 8 corresponds to a 1/n portion of the page (S27). If the CPU 2 determines that the converted dot image data corresponding to the 1/n portion has not yet been stored in the video RAM 8 (S27:No), the CPU 2 repetitively executes steps S25 and S26. If the CPU 2 determines that the converted dot image stored in the video RAM 8 corresponds to the 1/n portion (S27:Yes), as described above, the CPU 2 drives the sheet supply mechanism (not shown) to separate only one sheet (S28).

The CPU subsequently drives the sheet feeding mechanism (not shown) to feed the separated sheet to the print unit 6 (S29). The sheet is continuously fed until the sheet is discharged from the printer 1. The CPU 2 holds until the print timing pulse is input from the timing pulse generator 14 (S30). When the sheet is fed to a first print position, the print timing pulse is input from the timing pulse generator 14 (S30:Yes). In response to the print timing pulse, the CPU 2 outputs one raster's worth of dot image data stored in the video RAM 8 (S31). The CPU 2 then increments the count value of the second counter 4B by "1" (S32).

Subsequently, the CPU 2 determines whether the printing operation has arrived at the position where the over-run error previously occurred (S33). If the CPU 2 determines that the printing operation has not yet arrived at the position where the over-run error previously occurred (S33:No), the CPU 22 determines whether print data which has not yet been converted into dot image data exists in the RAM 4 (S41). If the CPU 2 determines that unconverted print data exists in the RAM 4 (S41:Yes), it converts the print data from the top of the unconverted print data in the RAM 4 into dot image data (S42).

If a next print timing pulse is not input from the timing pulse generator 14 to the CPU 2 (S43:No), the CPU 2 determines whether print data has been converted into one raster's worth of dot image data (S44). If the CPU 2 determines that the print data has not yet been converted into the dot image data (S44:No), the CPU 2 repetitively carries out steps S42–S44. If the CPU 2 determines that the print data has been converted into one raster's worth of dot image data (S44:Yes), the CPU 2 stores the converted dot image data into the video RAM 8. The CPU 2 then increments the count number of the first counter 4A by "1" (S45), and repetitively carries out steps S42–S45. Therefore, if a long time period is required to convert the image, the conversion of the print data into one raster's worth of dot image data is not completed before the next print timing pulse is input. Thus, the conversion operation is interrupted.

Upon input of a next print timing pulse from the timing pulse generator 14 to the CPU 2 (S42:Yes), the CPU 2 stops converting the unconverted print data in the RAM 4 into dot image data (S46). The CPU 2 compares the count number A of the first counter 4A to the count number B of the second counter 4B (S47). If the CPU 2 determines that A is greater than B, A>B, then at least one raster's worth of dot image data exists in the video RAM 8 (S47:Yes). Thus the CPU 2 carries out steps S31–S47 again.

If the CPU 2 determines that A is not greater than B, A ≯ B, at step S47 (S47:No), then as in step S18, the CPU 2 determines that a new over-run error has occurred, and continues to step S27. If at the step S33 the CPU 2 determines that the printing operation has reached the position where the over-run error previously occurred (S33:Yes), the CPU 2 stores into the video RAM 8 all of the pre-converted dot image data which was stored in the RAM 4 at step S24 (S34). The CPU then increments the count number A of the first counter 4A by the number of rasters of dot image data forming the 1/n portion which were just stored into the RAM 8 (S35).

In this case, since dot image data for a 1/n portion were already converted from the print data and stored in the RAM 4 at step S24, as described above, the dot image data stored in the RAM 4 is copied into the video RAM 8 within a very short time. Subsequently, upon the input of the next print timing pulse from the timing pulse generator 14 to the CPU 2 (S36:Yes), the CPU 2 outputs the next raster's worth of dot image data stored in the video RAM 8 (S37). The CPU 2 then increments the counter number of the second counter 4B by 1 (S38).

The CPU 2 compares the count number A of the first counter 4A to the count number B of the second counter 4B (S38). If the CPU 2 determines that A is greater than B, A>B, then at least one raster's worth of dot image data exists in the video RAM 8 (S39:Yes). In this case, the CPU 2 carries out steps S41–S42 again. If the CPU 2 determines that A is not greater than B, A ≯ B (S39:No), the CPU 2 determines that the printing operation for one page is completed, and stops printing. The sheet is discharged from the printer body 1 (S40), and printing is terminated.

This invention is not limited to the embodiment as described above, and various modifications may be made without departing from the subject matter of this invention. For example, in the above embodiment the printing operation is carried out using only one CPU. However, the printing operation may be carried out using two CPUs. That is, one CPU is used to carry out only the conversion of print data in the RAM 4 into dot image data. The other CPU is used to carry out the other data processing. In this case, the two CPUs may be so designed as to be synchronized with each other.

As is apparent from the above description, according to the page printer of this invention, dot image data at the time when an error occurs is reconverted and stored in another storage unit, so that the re-printing operation can be automatically carried out, and a previously-occurring error can be avoided in the re-printing operation.

What is claimed is:

1. A page printer, comprising:

data reception means for receiving print data from an external device;

first storage means for storing at least one page of the received print data;

image data preparation means for successively reading out the stored print data and preparing dot image data from the stored print data;

second storage means for storing dot image data corresponding to a 1/n portion of a page of the prepared dot image data;

print means for successively printing the stored dot image data to a recording medium;

detection means for detecting an absence of unprinted stored dot image data before the print means completely prints the stored print data to the recording medium;

re-printing means for actuating the image data preparation means and the print means to re-print the print data when the detecting means detects the absence of unprinted stored dot image data before the print means completely prints the stored print data to the recording medium; and third storage means for storing, before the reprinting operation of the re-print means, dot image data prepared by the image data preparation means by reading out print data corresponding to a next 1/n portion of the page corresponding to next dot image data to be output when the absence of the unprinted stored dot image data is detected by the detection means;

wherein said print means prints on the basis of the dot image data stored in both the second storage means and the third storage means when actuated by the re-print means.

2. The page printer of claim 1, further comprising:

first counter means for storing a first number indicative of a number of rasters of dot image data written to the second storage means; and second counter means for storing a second number indicative of a number of rasters of dot image data read from the second storage means.

3. The page printer of claim 2, wherein said detection means comprises comparing means for comparing the first number to the second number.

4. The page printer of claim 2, wherein said first and second counter means are reset after said detection means detects the absence of unprinted stored dot image data in said second storage means.

5. The page printer of claim 1, wherein said reprinting means reprints the entire page which was not completely printed.

6. The page printer of claim 1, further comprising alarm means for indicating when said detection means detects the absence of unprinted stored dot image data in said second storage means.

7. The page printer of claim 6, wherein said alarm means is at least one of a visual alarm and an audio alarm.

8. The page printer of claim 1, wherein said first storage means and said third storage means are different portions of a single memory means.

9. The page printer of claim 1, wherein when said image data preparation means reads out and prepares dot image data corresponding to the next 1/n portion, a first raster of the prepared dot image data stored in said third storage means being adjacent to a last printed raster.

10. The page printer of claim 1, wherein a last printing position corresponding to a last printed raster is stored in said third storage means.

11. The page printer of claim 10, wherein when a current printing portion corresponds to the last printing position, said retransferring means copies the next 1/n dot image data portion stored in said third storage means into said second storage means.

12. A method for controlling a page printer, comprising the steps of:

inputting at least one page of print data;

storing the input print data to a first storage means;

converting a portion of the input print data to a number of rasters of dot image data, the number of rasters corresponding to a predetermined fraction of the page of print data;

storing the number of rasters to a second storage means;

printing, after the number of rasters are stored to the second storage means, the print data to a recording medium, on the basis of the rasters of dot image data stored in the second storage means;

determining if any unconverted print data remains in the first storage means;

converting additional portions of the remaining unconverted print data to additional dot image data;

storing the addition dot image data to the second storage means on a raster-by-raster basis;

determining if any unprinted dot image data remains in the second storage means; and generating an over-run error signal if no remaining unprinted dot image data exists while remaining unconverted print data exists; and further comprising, when the over-run error signal is generated, the steps of:

converting a further portion of the remaining unconverted print data corresponding to the predetermined fraction of the page to further dot image data;

storing the further dot image data to a third storage means; and reprinting the print data to a recording medium on the basis of the dot image data stored in the second storage means and the further dot image data stored in the third storage means.

13. The method of controlling a page printer of claim 12, wherein the steps of storing the number of rasters and storing the additional dot image data each comprises incrementing a first counter by the number of rasters;

the step of printing comprises incrementing a second counter; and the determining step comprises comparing said first counter to said second counter.

14. The method of controlling a page printer of claim 12, wherein the generating step comprises:

determining an error position on the recording medium; and storing said determined error position; and the reprinting step comprises comparing a current position to said stored error position.

15. The method of controlling a page printer of claim 14, wherein the reprinting step further comprises transferring the further dot image data from said third storage means to said second storage means when the current position coincides with the error position.

* * * * *